United States Patent Office 2,873,282
Patented Feb. 10, 1959

2,873,282
CATALYTIC PROCESS FOR PRODUCING ALKYLENE CARBONATES

Paul P. McClellan, Old Greenwich, Conn., assignor to Jefferson Chemical Company, Inc., New York, N. Y., a corporation of Delaware No Drawing. Application April 5, 1952
Serial No. 280,853

14 Claims. (Cl. 260—340.2)

This invention relates to the production of alkylene carbonates by the reaction of alkylene oxides with carbon dioxide, and more particularly to such processes in which catalysts are employed for catalyzing the reaction, especially the reaction of ethylene oxide with carbon dioxide to form ethylene carbonate. Ethylene carbonate and alkylene carbonates are also known as glycol carbonates.

Reaction of ethylene oxide with carbon dioxide in the presence of sodium hydroxide on activated carbon as the catalyst has been suggested. This catalyst, however, has been found unsatisfactory for a number of reasons among which may be mentioned that it results in poor yields of ethylene carbonate badly contaminated with by-products.

It is an object of this invention to provide a catalytic process for producing alkylene carbonates by reacting alkylene oxides with carbon dioxide, which process results in an increase in yield and otherwise improves the production of the desired end product.

Other objects and advantages of this invention will be apparent from the following detailed description thereof.

In accordance with this invention alkylene oxides are reacted with carbon dioxide in the presence of the hydroxides, carbonates or bicarbonates of quaternary ammonium bases as catalysts.

Preferred catalysts are the quaternary ammonium compounds having the following structural formula:

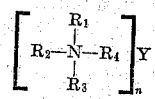

in which $R_1$, $R_2$, $R_3$, and $R_4$ are the same or different, are alkyl, aralkyl, alkenyl (a monovalent radical containing a double bond including, for example, allyl and vinyl) or aminoalkyl groups containing from 1 to 20 carbon atoms, the sum of the carbon atoms $R_1$, $R_2$, $R_3$, and $R_4$ is not less than 4 and not more than 40, Y is a hydroxide, carbonate or bicarbonate radical and the value of $n$ is equal to the valence of Y, and quaternary ammonium compounds having the following structural formula:

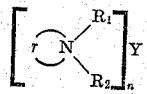

in which $R_1$, $R_2$, $n$ and Y have the meaning noted above and $r$ is a divalent radical as follows:

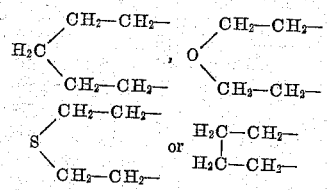

Examples of quaternary ammonium compounds suitable as catalysts in accordance with this invention and having a structural formula corresponding to the first formula above given are trimethyl benzyl ammonium hydroxide, tetraethyl ammonium hydroxide, trimethyl cetyl ammonium hydroxide, trimethyl butyl ammonium hydroxide, tetrabutyl ammonium hydroxide, diethyl di-amyl ammonium hydroxide, other tetraalkyl ammonium hydroxides in which the alkyl groups are the same or different and each alkyl group contains from 1 to 20 carbon atoms, and the corresponding carbonates and bicarbonates of the above enumerated compounds.

Examples of quaternary ammonium compounds having a structural formula corresponding to the second formula above given are methyl ethyl piperidinium hydroxide, ethyl butyl pyrrolidinium hydroxide, methyl decyl piperidinium hydroxide, 4,4-benzyl methyl morpholinium hydroxide, 4,4-diallyl morpholinium hydroxide, 4,4-methyl hexyl morpholinium hydroxide, 4,4-ethyl butyl morpholinium hydroxide, 4,4-diethyl thiomorpholinium hydroxide, other dialkyl piperidinium, pyrrolidinium, morpholinium, and thiomorpholinium hydroxides, in which the alkyl groups are the same or different and contain from 1 to 20 carbon atoms, and the corresponding carbonates and bicarbonates of such piperidinium, pyrrolidinium, morpholinium and thiomorpholinium compounds.

N,N,N',N',N'-hexamethyl-ethylene-bis - ammonium hydroxide, carbonate and bicarbonate are also effective catalysts. The formula for the hydroxide is $(H_3C)_3N—CH_2—CH_2—N—(CH_3)_3(OH)_2$ The alkylene oxides which may be employed in the reaction are those of the oxirane system. Preferably the alkylene oxides employed have a structural formula:

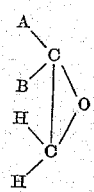

in which A or B may be hydrogen, phenyl, alkyl, alkenyl or haloalkyl, which alkyl, alkenyl or haloalkyl group contains from 1 to 20, preferably 1 to 5, carbon atoms. At the present time ethylene oxide is the most important commercially with propylene oxide probably next in commercial importance. The oxirane compounds as shown by the formula have the ring oxygen atom attached to two adjacent carbon atoms.

The reaction is carried out at a temperature of from 100° to about 225° C., preferably from 175° to 215° C., and under a pressure of from 300 to 5000 pounds per square inch gauge, preferably 1000 to 2500 pounds per square inch gauge. The reaction may be conducted either batchwise or continuously. For example, the catalyst may be continuously introduced in solution form along with the alkylene oxide and the carbon dioxide under desired pressure into one end of a reaction vessel and the products of reaction continuously withdrawn from the other end. Alternatively, batches of the alkylene oxide and the catalyst may be introduced into an autoclave or bomb type of reactor, the desired pressure built up by introducing carbon dioxide and the reaction mixture agitated while maintained under a superatmospheric pressure of carbon dioxide. Irrespective of whether a batch or continuous procedure is followed, each unit weight of reactant and reaction product resulting therefrom are maintained at reaction temperature for from 10 to 90 minutes, preferably from 20 to 30 minutes. This time interval is referred to herein as the reaction time.

The alkylene oxide and carbon dioxide are mixed in proportions to provide an excess of carbon dioxide over and above the stoichiometric amount required for reaction. This excess may be of the order of from 1% to 500% by weight. An excess of alkylene oxide should be avoided because it results in undesired by-products, chiefly alkylene oxide polymers and creates an explosion hazard.

The quaternary ammonium compound may be obtained as such from any available source or produced in any desired manner. Thus, for example, trimethylbenzylammonium hydroxide is obtainable dissolved in water or alcohol. The hydroxide, it is believed, is converted during the course of the reaction to the carbonate or bicarbonate by reaction with the carbon dioxide present and the carbonate or bicarbonate effectively catalyzes the reaction. It is preferred not to employ the hydroxide in water or alcohol solution because these solvents enter into side reactions with the alkylene oxide. To avoid the difficulty arising from the tendency of trimethylbenzylammonium hydroxide to decompose when the aqueous or alcoholic solvent is removed, the hydroxide can be converted to the bicarbonate by saturating the solution with carbon dioxide and the bicarbonate thus formed recovered as a stable solid material by evaporation of the solvent. This solid may be added to the reaction mixture or it may first be dissolved desirably in the alkylene carbonate and the resulting solution added to catalyze the reaction.

Trimethylbenzylammonium bicarbonate may also be produced by reacting a methanol solution of trimethylbenzylammonium chloride with sodium hydroxide, separating the sodium chloride precipitate thus formed, and saturating the residual liquid with carbon dioxide to form trimethylbenzylammonium bicarbonate. Trimethylbenzylammonium bicarbonate catalyst may be produced by reacting benzyl chloride with trimethyl amine, treating the reaction product with a methanol solution of potassium hydroxide to precipitate potassium chloride, saturating the methanol solution of trimethylbenzylammonium hydroxide thus produced with carbon dioxide to form the bicarbonate and dissolving the trimethylbenzylammonium bicarbonate in the alkylene carbonate, e. g. ethylene carbonate, to produce a solution of the bicarbonate for use as the catalyst.

The amount of catalyst used in general should be from 0.1% to 5%, preferably from 1% to 2% based on the weight of the alkylene oxide.

The quaternary ammonium compounds preferably are employed in their monomeric form. However, the invention is not limited to the use of the monomers as catalysts, but includes the use of ion exchange resins containing quaternary ammonium groups such as the resins Amberlite IRA-400 and Amberlite IRA-410 manufactured by Rohm & Haas, and Dowex-1 and Dowex-2 manufactured by the Dow Chemical Company which are described in U. S. Patent No. 2,718,489. These resins contain quaternary ammonium chloride polymers. In the use of the resins as catalysts, the chloride ion is replaced by the bicarbonate ion by treatment of the resins with sodium bicarbonate solution. The resultant resins are thus derivable from monomers having a structural formula the same as that noted above for the quaternary ammonium compounds.

It will be understood that in the claims the reference to quaternary ammonium compounds includes such compounds in the polymeric form as well as the monomers.

The following examples illustrate the invention but are not to be regarded as limiting it in any way. In these examples all parts are by weight.

*Example I*

264 parts of ethylene oxide and 2.6 parts of trimethylbenzylammonium bicarbonate are charged into a reactor. Carbon dioxide is introduced into this reactor to build up the pressure to 500 pounds per square inch gauge at 39° C. and provide an excess of carbon dioxide over and above the stoichiometric amount required for the reaction. The reactor is then sealed and heat applied until the temperature reaches 198° C. and pressure reaches 1800 pounds per square inch gauge. After 30 minutes the temperature reaches 212° C. while the pressure decreases to 1200 pounds per square inch gauge, indicating the reaction is complete. The reactor is then cooled and opened and 480 parts of reaction product removed. A yield of ethylene carbonate of 85% of theoretical is obtained.

*Example II*

This example in general is the same as Example I except that the catalyst trimethylbenzylammonium bicarbonate is introduced as a 15% by weight solution in ethylene carbonate and approximately 2% based on the weight of ethylene oxide of trimethylbenzylammonium bicarbonate is added to the reaction mixture. A yield of ethylene carbonate of 90% of theoretical is obtained.

The substitution of other alkylene oxides, such as propylene oxide or butylene oxide for the ethylene oxide in the above examples results in the production of the corresponding alkylene carbonates.

*Example III*

Dowex-2, a commercial resinous material containing quaternary ammonium chloride groups, is placed in a tube and a solution of sodium bicarbonate is passed through it until the effluent is practically free of chloride ions. The chloride ions in the resin are thus replaced by bicarbonate ions. The resinous material is washed with water and then dried. 200 parts of ethylene oxide and 20 parts of the treated resinous material are charged into a reactor. Carbon dioxide is introduced until the pressure reaches 550 pounds per square inch gauge at 45° C. and provides an excess of carbon dioxide over and above the stoichiometric amount required for reaction. The reactor is then sealed and heated while shaking to a temperature of from 170° to 190° C. for one hour. The pressure reaches a maximum of 1500 pounds per square inch gauge and then gradually drops to a pressure of 440 pounds per square inch gauge at 182° C. 325 parts of crude product are removed from the reactor. A yield of ethylene carbonate of 72% of theoretical is obtained.

*Example IV*

Amberlite IRA-410, a commercial resinous material containing quaternary ammonium chloride groups is treated, in the same way as the Dowex-2 was treated in Example III, to replace the chloride ions by bicarbonate ions. 200 parts of ethylene oxide and 20 parts of the treated resinous material are charged into a reactor. Carbon dioxide is introduced until the pressure reaches 690 pounds per square inch gauge at 42° C. and provides an excess of carbon dioxide over and above the stoichiometric amount required for reaction. The reactor is then sealed and heated while shaking to a temperature of from 170° to 190° C. for 2 hours. The pressure reaches a maximum of 1920 pounds per square inch gauge and then slowly drops to a pressure of 1430 pounds per square inch gauge at 170° C., and 337 parts of crude product are removed from the reactor. A yield of ethylene carbonate of 79% of theoretical is obtained.

*Example V*

174 parts of propylene oxide and 3.5 parts of trimethylbenzylammonium bicarbonate are charged into a stainless steel rocking autoclave and carbon dioxide introduced to a gauge pressure of 500 pounds per square inch. Enough carbon dioxide is thus introduced to provide an excess of carbon dioxide over and above the stoichiometric amount required for reaction. When heating is commenced, the pressure reaches a maximum of 1750 pounds per square inch gauge at a temperature of 170° C. After keeping at a temperature of between 170° and 190° C. for a half hour the reaction mixture is cooled and discharged from the autoclave. It is then vacuum distilled producing 296 parts of colorless propylene carbonate boiling at 75° C. at a pressure of 1.8 mm. of mercury.

Example VI

Styrene oxide and carbon dioxide are reacted in the same manner and proportions as in the case of the reaction of propylene oxide and carbon dioxide in Example V using diethyldiamylammonium bicarbonate catalyst. The reaction temperature is 145° C. The maximum pressure reached is 700 pounds per square inch gauge and the reaction time is 1 hour. About 84% of styrene carbonate is obtained as a yellow oil solidifying at 51° C. and boiling with some decomposition at a temperature of 150° C. at a pressure of 2 mm. of mercury.

Example VII

Epichlorohydrin and carbon dioxide are reacted in substantially the same manner and the same proportions as in the case of the propylene oxide and carbon dioxide of Example VI using trimethylbenzylammonium bicarbonate as the catalyst. The reaction occurs at a temperature of 120° to 150° C.; the maximum pressure reached during the course of the reaction is 700 pounds per square inch gauge. With a reaction time of one-half hour a yield of 92.5% of chloromethylethylene carbonate in the form of a colorless oil is obtained.

Substitution of a bromo, fluoro or iodo propylene oxide for the epichlorohydrin in this example results in the formation of the bromo-, fluoro- or iodo-methylethylene carbonates, respectively.

Example VIII

This example differs from Example VII in that the reactants used are isobutylene oxide and carbon dioxide and the catalyst used is methyl ethyl piperidinium hydroxide. Reaction temperature and pressure are substantially the same as in Example VII. Isobutylene carbonate in the form of a water-white product boiling at 58° C. at 1–2 mm. of mercury and solidifying at 25° C. is obtained in 78% yield.

Example IX

In this example butadiene monoxide and carbon dioxide are reacted under substantially the same temperature and pressure conditions as in Example VII employing, however, ethyl butyl pyrrolidinium carbonate as the catalyst. Vinyl ethylene carbonate is obtained in approximately 75% yield.

Example X 220 parts of ethylene oxide, and 2 parts of 4,4-benzyl methyl morpholinium hydroxide are charged into a rocking autoclave. Carbon dioxide is introduced to build up the pressure to 500 pounds per square inch gauge at room temperature and provide an excess of carbon dioxide over and above the stoichiometric amount required for the reaction. The autoclave is then sealed, heat is applied, and rocking is commenced. The application of heat is regulated so that the temperature during the reaction period is held between about 190° C. and 210° C. The pressure reaches a peak of about 1900 pounds per square inch and falls in the course of one hour to about 1100 pounds per square inch gauge. The autoclave is then allowed to cool down to room temperature. 410 parts of reaction mixture are obtained, which is neutralized with hydrochloric acid. The product is extracted twice with 400 parts of ethylene dichloride. Evaporation of solvent from the combined extracts leaves a residue of 375 parts of ethylene carbonate, a yield of about 85%.

The substitution of the 4,4-benzyl methyl morpholinium carbonate or bicarbonate for the hydroxide, and the use of diethyl and other dialkyl thiomorpholinium hydroxides, carbonates and bicarbonates as catalysts in the above example gives approximately the same yield of ethylene carbonate.

Alkylene carbonates are useful as solvents and as chemical intermediates. They dissolve many resins and polymeric materials, for example, polyamides and acrylic polymers. They are useful in chemical synthesis for substituting a beta-hydroxy alkyl group in place of the active hydrogen atom of amines, alcohols, mercaptans, phenols, thiophenols and carboxylic acids. Alkylene carbonates of present commercial interest are those containing from 2 to 10 carbon atoms; of these the most important at the present time is ethylene carbonate.

It is to be understood that this invention is not restricted to the present disclosure, except as defined by the appended claims.

What is claimed is:

1. A process for the manufacture of an alkylene carbonate which comprises reacting an alkylene oxide of the oxirane system having the formula

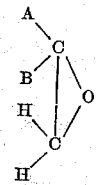

in which A and B are from the group consisting of hydrogen, phenyl, alkyl containing from 1 to 20 carbon atoms, alkenyl containing from 1 to 20 carbon atoms and haloalkyl containing from 1 to 20 carbon atoms with carbon dioxide in the presence of a catalyst from the group consisting of quaternary ammonium compounds having the following structural formula

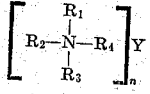

in which $R_1$, $R_2$, $R_3$, and $R_4$ are from the group consisting of alkyl, aralkyl, aminoalkyl and alkenyl radicals each containing from 1 to 20 carbon atoms, the sum of the carbon atoms in $R_1$, $R_2$, $R_3$ and $R_4$ is not less than 4 and not more than 40, Y is a radical from the group consisting of hydroxide, carbonate and bicarbonate and the value of $n$ is equal to the valence of Y, quaternary ammonium compounds having the following structural formula

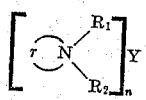

in which $R_1$, $R_2$, $n$ and Y have the same meaning as set forth above and $r$ is a divalent radical from the group consisting of

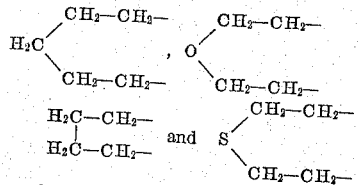

and ion exchange resins having quaternary ammonium groups.

2. A process for the manufacture of an alkylene carbonate as defined in claim 1, in which the reaction is carried out at a temperature of from 100° to 225° C. and under a pressure of from 300 to 5000 pounds per square inch gauge.

3. A process for the manufacture of ethylene carbonate which comprises reacting ethylene oxide and carbon dioxide in the presence of a catalyst from the group consisting of quaternary ammonium compounds having the following structural formula

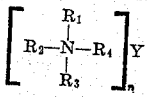

in which $R_1$, $R_2$, $R_3$ and $R_4$ are from the group consisting of alkyl, aralkyl, aminoalkyl and alkenyl radicals each containing from 1 to 20 carbon atoms, the sum of the carbon atoms in $R_1$, $R_2$, $R_3$ and $R_4$ is not less than 4 and not more than 40, Y is a radical from the group consisting of hydroxide, carbonate and bicarbonate and the value of $n$ is equal to the valence of Y, quaternary ammonium compounds having the following structural formula

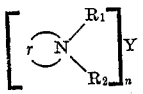

in which $R_1$, $R_2$, $n$ and Y have the same meaning as set forth above and $r$ is a divalent radical from the group consisting of

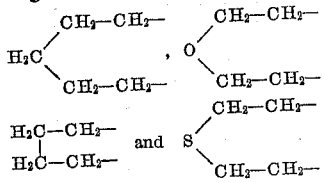

and ion exchange resins having quaternary ammonium groups.

4. A process for the manufacture of ethylene carbonate as defined in claim 3, in which the reaction is carried out at a temperature of from 100° to 225° C. and under a pressure of from 300 to 5000 pounds per square inch gauge.

5. A process for producing lower alkylene carbonates which comprises reacting a lower alkylene oxide with carbon dioxide at a temperature between 100° C. and 225° C. and at a pressure of 500 to 2400 pounds per square inch in the presence of trimethylbenzylammonium carbonate as a catalyst.

6. A process for the manufacture of ethylene carbonate which comprises reacting ethylene oxide with carbon dioxide in the presence of trimethylbenzylammonium carbonate.

7. A process for the manufacture of propylene carbonate which comprises reacting propylene oxide with carbon dioxide in the presence of a catalyst from the group consisting of the hydroxides, carbonates and bicarbonates of quaternary ammonium bases as defined in claim 1.

8. A process for producing lower alkylene carbonates which comprises reacting a lower alkylene oxide with carbon dioxide in the presence of a catalyst from the group consisting of the hydroxides, carbonates and bicarbonates of quaternary ammonium bases as defined in claim 1.

9. A process for producing a glycol carbonate which comprises reacting an oxirane having the ring oxygen atom attached to two adjacent carbon atoms with carbon dioxide at a pressure above 500 pounds per square inch and at an elevated effective reaction temperature above 100° C. in the presence of trimethylbenzylammonium carbonate as catalyst.

10. A process according to claim 3 in which said quaternary ammonium compound is diethyldiamylammonium bicarbonate.

11. A process according to claim 3 in which said quaternary ammonium compound is methylethylpiperidinium hydroxide.

12. A process according to claim 3 in which said quaternary ammonium compound is ethylbutylpyrrolidinium carbonate.

13. A process according to claim 3 in which said quaternary ammonium compound is 4,4-benzylmethylmorpholinium hydroxide.

14. A process for producing propylene carbonate which comprises reacting propylene oxide with carbon dioxide at a pressure about 500 p. s. i. g. and at an effective reaction temperature above 100° C. in the presence of trimethylbenzylammonium carbonate catalyst.

References Cited in the file of this patent

UNITED STATES PATENTS

| | | |
|---|---|---|
| 1,907,891 | Steimmig et al. | May 9, 1933 |
| 2,511,942 | Prichard | June 20, 1950 |

FOREIGN PATENTS

| | | |
|---|---|---|
| 740,366 | Germany | Oct. 19, 1943 |